United States Patent [19]

Danese

[11] Patent Number: 5,326,798
[45] Date of Patent: Jul. 5, 1994

[54] WATERPROOFING MEMBRANE APPLICABLE BY HEATING WITH AIR-BLOWN BITUMEN

[76] Inventor: Marco Danese, Via Tezone 5, 37100 Verona, Italy

[21] Appl. No.: 867,647

[22] Filed: Apr. 13, 1992

[30] Foreign Application Priority Data

Apr. 15, 1991 [IT] Italy .................. VR91A000034

[51] Int. Cl.$^5$ .................. C08L 95/00; C08K 3/26; C08K 3/24
[52] U.S. Cl. .................. 524/70; 524/68; 524/427; 524/447; 524/451
[58] Field of Search ........... 524/68, 70, 427, 447, 524/451; 428/489

[56] References Cited

U.S. PATENT DOCUMENTS

| | | | |
|---|---|---|---|
| 3,154,508 | 10/1964 | Clelland | 260/28.5 |
| 3,890,263 | 6/1975 | Meynard | 260/28.5 AS |
| 3,978,014 | 8/1976 | van Beem et al. | 260/28.5 AS |
| 4,073,760 | 2/1978 | Harris et al. | 260/28.5 AS |
| 4,282,127 | 8/1981 | Desgouilles | 260/28.5 AS |
| 4,659,759 | 4/1987 | Jeranoff et al. | 524/68 |
| 4,707,413 | 11/1987 | Kehr et al. | 428/440 |
| 4,829,109 | 5/1989 | Ciaccia et al. | 524/70 |
| 4,837,252 | 6/1989 | Seguin et al. | 524/70 |
| 4,859,757 | 8/1989 | Pellon et al. | 526/348 |
| 5,077,327 | 12/1991 | Cecchin et al. | 524/68 |

FOREIGN PATENT DOCUMENTS 0341379 11/1989 European Pat. Off.

Primary Examiner—Paul R. Michl
Assistant Examiner—La Vonda DeWitt
Attorney, Agent, or Firm—Guido Modiano; Albert Josif

[57] ABSTRACT

Composition of waterproofing membrane suitable for being applied by means of hot bitumen both on a new covering and on a previous waterproofing layer based on blown bitumen, which is characterized in that it comprises 50 to 80% by weight of distilled bitumen, 8 to 20% by weight of amorphous ethylene-propylene and/or ethylene-propylene-butene 1 copolymer, and 5 to 15% by weight of amorphous polypropylene homopolymer, and optionally up to 40% by weight of a filler and/or up to 1% by weight of an antioxidant.

6 Claims, No Drawings

WATERPROOFING MEMBRANE APPLICABLE BY HEATING WITH AIR-BLOWN BITUMEN

BACKGROUND OF THE INVENTION

The present invention relates to a waterproofing membrane based on bitumen modified with polyolefins which can be applied on-site by using oxidized or air-blown bitumen.

As is well-known to the experts in the field, bitumen is generally modified by using polymers in order to produce mixtures which, when hot, are suitable for impregnating and coating supporting frames of various kinds for coverings, in order to obtain membranes which can ensure the waterproofing of the coverings of buildings and structures in general.

A distinction is often made between membranes based on bitumen modified with elastomers and those based on bitumen modified with polymer plastics. In the former, the waterproofing mass is essentially constituted by a mixture of bitumen and elastomers of the SBS (styrene-butadiene-styrene) block copolymer type, whereas in the latter if is constituted by mixtures of thermoplastic polyolefins and distilled bitumens. The most used polyolefins are atactic polypropylene, a by-product which is generally obtained from the production of isotactic polypropylene, and the ethylene-propylene copolymer, which also has an amorphous nature.

Waterproofing membranes are generally obtained in sheets of 3,4 or 5 mm thickness and, if total or partial adhesion to the support is required, they can be applied either by means of a propane-gas torch, which by liquefying the bituminous mass makes it adhere to said support, or by using hot air-blown bitumen which acts as an adhesive.

However, while membranes based on bitumen modified with SBS yield good results with both methods (with preference for the air-blown bitumen method, due to some limitations of the SBS membrane with the torch method, such as excessive softening which almost always prevents rapid and easy application of the membrane, especially in summer), polyolefin-based membranes generally yield the best results only with the flame method; this especially because otherwise, in the course of time, adhesion tends to decrease due to the forming of an oily layer between the air-blown bitumen and the membrane which causes its separation in the course of time.

This fact constitutes a limitation to the use of polyolefin-based membranes (especially in some countries, where the use of hot bitumen is still very common), which instead intrinsically have, with respect to membranes based on SBS elastomer, some distinct advantages, such as greater resistance to aging (both thermal aging and aging due to the action of UV rays) and a better seal at high temperatures.

It is also well-known to add, as already mentioned, polyolefins to the bitumen, and to use polyolefins together with their copolymers and rubbers Generally, these products are added in order to improve some mechanical characteristics of the mixtures, such as flexibility at low temperatures, elasticity or ultimate elongation.

This is taught for example by U.S. Pat. No. 4,659,759, in which an elastomeric component (an ethylene-propylene copolymer) is added to the bitumen in order to improve its properties at high and low temperatures. European patent no. 0009432 provides for the addition of SBS (styrene-butadiene-styrene) to a mixture of bitumen +polyolefins in order to improve its characteristics in terms of resistance to low temperatures as well as the ultimate elongation of the mixture.

From this point of view, an exception is found in U.S. Pat. No. 4,771,090, which provides for the use of an amorphous copolymer of ethylene-propylene-butadiene (EPDM) in order to obtain a waterproofing membrane which can be flame-applied onto a previous waterproofing layer produced with material based on air-blown bitumen.

However, said patent expressly states that the presence of a particular EPDM elastomer in the composition of the waterproofing mass is indispensable in order to achieve good adhesion to the product based on air-blown bitumen; as is known, this is a relatively very expensive elastomer. All this is supported by numerous examples which demonstrate the validity of this statement

SUMMARY OF THE INVENTION

The aim of tho present invention is to provide a composition of waterproofing membranes based on bitumen modified with polyolefins without the addition of EPDM elastomer, so as to be competitive with respect to membranes based on bitumen modified with SBS elastomer, which are those normally used when it is necessary to apply a membrane based on modified bitumen by using hot bitumen.

Another object of the present invention is to provide waterproofing membranes which have satisfactory marketing characteristics without resorting to the use of isotactic polypropylene, which besides increasing the cost of the finished product reduces compatibility between the polymer and the bitumen.

This aim, these objects and others which will become apparent hereinafter are achieved by a composition of waterproofing membrane suitable for being applied by means of hot bitumen both on a new covering structure and on a previous waterproofing layer based on air-blown bitumen, which is characterized in that it comprises 50 to 80% by weight of distilled bitumen, 8 to 20% by weight of amorphous ethylene-propylene and/or ethylene-propylene-butene-1 copolymer, and 1 to 20% by weight of amorphous polypropylene homopolymer.

Preferably, the composition of the invention comprises 5-15% by weight of amorphous polypropylene homopolymer.

Advantageously, the composition may comprise up to 30% by weight of filler and/or up to 1% by weight of an antioxidant additive.

Furthermore, the above composition can be impregnated and covered with a reinforcement made of a suitable material, such as glass film, polyester non-woven fabric and the like, so as to obtain a product which can be rolled up and used in one or more layers to waterproof coverings of buildings, civil engineering structures and the like.

The composition according to the present invention is further described and illustrated hereinafter with reference to examples of practical embodiments.

DESCRIPTION OF THE PREFERRED EMBODIMENTS

The term "amorphous ethylene-propylene copolymer" refers to an elastic polymer which is formed by two monomers, namely ethylene and propylene. Normally, but not necessarily, said polymer is a by-product of the production of polypropylene. Preferably, said copolymer must have a viscosity comprised between 0.1 and 5 million mPa.s at 180°. C. (shear rate 5.6/sec), contain 5 to 40% ethylene and have low crystallinity values. Said product is hereinafter designated "Copolymer 1".

Another type of amorphous copolymer which can advantageously be used in the composition according to the present invention is the ethylene-propylene-butene copolymer, which has a composition comprised between 25–70% propylene, 20–70% butene-1 and 0–15% ethylene. Preferably, the composition should be comprised between 0–15% ethylene, 60–70% propylene and 20–30% butene-1 and have a viscosity at 180° C. comprised between 20,000 and 120,000 mPa.s, preferably comprised between 40,000 and 100,000 mPa.s. The crystallinity value of this type of material is rather low, not more than 7 J/g measured with the method of DSC (differential scanning calorimetry). Said product is designated hereinafter as "Copolymer 2".

The term "distilled bitumen" commonly designates the residue from atmospheric distillation of crude oil or of a mixture thereof with a slightly oxidized product. The softening point of the various types (according to the ASTM D-36 method) varies from +36° C. to +70° C., and the penetration number (according to the ASTM D-5 method) is generally comprised between 40 and 350 dmm; bitumens which have a penetration number comprised between 60 and 220 dmm and an R&B (ring and ball) softening point comprised between 37° C. and 48° C. are preferably used for modification with polymers. It is furthermore possible to use mixtures of various types of bitumen, and the properties of the bitumen can be modified by adding mineral oils, fatty substances, chemical agents which make it impenetrable to roots (such as for example the product marketed by the German company Bayer under the trade-name PREVENTOL B2), and others.

The amorphous polypropylene homopolymer, also known as atactic polypropylene, is generally but not necessarily obtained as a by-product of the production of isotactic polypropylene. Depending on the type of isotactic polypropylene obtained, it is possible to have different grades of atactic polypropylene, with viscosities at 180° C. which can vary between 250 and 100,000 mPa.s (shear rate 5.2/sec) and various degrees of crystallinity measured with the DSC method.

Atactic polypropylenes having a viscosity comprised between 1,000 and 50,000 mPa.s and having a crystallinity not higher than 20 J/g and preferably comprised between 1 and 10 J/g are preferably used for our purpose.

The types of filler commonly used in this type of mixture are various. Among them, it is possible to include slate powder, calcium carbonate, talc, kaolin and other compounds which are well-known in the state of the art. The purpose of the use of filler is to increase the stability of the mixture and reduce its cost.

Preferably, the filler used must have such a fineness as to pass through a 90-micron screen, although fillers which pass to an extent of 95% through a 75-micron (200-mesh) screen can be used.

As antioxidants it is possible to use conventional products which are known in the state of the art, such as the type IRGANOX 1010 of the Ciba company (pentaerythrityl-tetrakis 3-(3,5-di-tert-butyl-4-hydroxyphenyl)-propionate) or NAUGARD XL-1 of the Uniroyal company (2,2'-oxamido-bis-ethyl 3-(3,5-di-tertbutyl-4-hydroxyphenyl)-propionate).

The waterproofing mass which constitutes the membrane according to the present invention can be produced simply by introducing, in a conventional screw mixer, the various polymers into hot bitumen at a temperature comprised between 180° C. and 200° C.; for better and quicker dispersion, it is also possible to use mixers with a high shear action; the filler is normally advantageously added when complete dispersion of the polymers in the bitumen has been achieved.

Surprisingly, and only in accordance with what is provided for by the present invention, only mixtures which contain polymers in the above-indicated proportions and do not contain isotactic polypropylene have proved to have good adhesion values after aging.

Another important result achieved with the present invention is that for an equal formulation, the smaller the crystallinity of the polymers used, measured according to the DSC method and expressed in J/g, the greater the adhesion after aging.

Various examples of embodiments are listed in Table 1, and all the mixtures were prepared in the manner explained hereinafter.

Type 180/200 bitumen is heated to approximately 190° C. in a vessel contained in a silicone oil thermostatic bath which is kept at a temperature of 200 ±2° C. The polymers are then introduced in the following sequence: homopolymer, copolymer and isotactic polypropylene, if required for comparison tests; the additions are made slowly and, when good dispersion of the polymers has been achieved, the mixture is completed with the addition of the filler, in this case calcium carbonate which passes to an extent of 98% through a 75-micron (200-mesh) screen. The total mixing time is 2 hours and 30 minutes, and mixing is ensured by a double-screw mixer which rotates at a rate of 300 rpm. The total amount of each mixture is 700 g. At the end of the mixing, the characterization tests reported in the examples are performed on the product: part of said product is furthermore poured into an appropriate mold so as to obtain specimens with a thickness of 4 mm and a length of 350 mm; a strengthening material (reinforcement) is present in the mold and is constituted by polyester nonwoven fabric obtained from continuous yarn with a weight of 125 g/m$^2$ of the type known as Colback, manufactured by Colbond B.V.-Arnhem (The Netherlands). The waterproofing mass is poured into the mold in such a way as to acceptably impregnate the polyester and position the reinforcement approximately in the median part of the specimen. The polyester non-woven fabric samples used are of the L type (i.e. they are taken from the roll along the longitudinal direction).

The sample thus obtained, after remaining for 24 hours at room temperature comprised between 20° C. and 25° C., is applied by means of type 85/25 hot airblown bitumen onto a support based on asbestos cement treated beforehand with a bituminous primer in the amount of 200 g/m$^2$. The temperature of the air-blown bitumen is comprised between 200° and 220° C. and the quantity used is approximately 1.5 kg/m$^2$.

The specimen thus obtained is then subjected to a peeling test, which consists in placing the 10-mm-thick asbestos-cement test piece, to which the sample to be tested has been made to adhere beforehand for a length of 80 mm, in the lower clamp of an Instron type 4301 dynamometer manufactured by the Instron Co. - Ma -

USA, and in placing the other end of the sample in the upper clamp. The angle between the end which adheres to the asbestos-cement support and the end inserted in the upper clamp is 90°. The test is then performed at a temperature comprised between 20° and 25° C., separating the two clamps at the constant rate of 100 mm/min and taking note of the force required (expressed in daN) to separate the specimen from the support.

This test is performed after the test piece has remained for 24 hours at room temperature and after it has remained at 70° C. for 7, 14 and 28 days, according to an accelerated aging cycle suggested by the rules of the UEAtc (Union Européenne pour l'Agrégation technique dans la construction). Three specimens are prepared for each test, and the results reported in the following examples are the arithmetical mean of the results obtained in the three tests.

Table 1 reports examples of mixtures of bitumen and amorphous polyolefins. Each mixture was prepared as described above. The percentages reported are understood to be by weight.

TABLE 1

|  | MIXTURES | | | |
| --- | --- | --- | --- | --- |
|  | 1 | 2 | 3 | 4 |
| Bitumen 180/220 | 68,5 | 68,5 | 58,1 | 53,3 |
| Copolymer 1 | 11,9 | 9,1 | 9,7 | — |
| Copolymer 2 | — | — | — | 11,5 |
| Homopolymer 1 | 11,4 | 11,4 | 5,0 | 5,0 |
| Homopolymer 2 | — | — | — | — |
| Filler (calcium carbonate) | 8,0 | 8,0 | 27,0 | 30,0 |
| Isotactic polypropylene | — | 2,8 | — | — |
| Irganox 1010 | 0,2 | 0,2 | 0,2 | 0.2 |
| Penetration number at 25° C. dmm | 30 | 27 | 34 | 32 |
| Penetration number at 60° C. dmm | 70 | 51 | 94 | 83 |
| R&B softening point °C. | 150 | 152 | 141 | 146 |
| Viscosity at 180° C. mPa · s | 2750 | 3500 | 2500 | 2250 |
| Cold flex °C. | −15 | −15 | −15 | −15 |
| Peeling test: | | | | |
| after 24 h at 21° C. daN | 11,30 | 8,98 | 9,30 | 8,90 |
| after 7 days at 70° C. daN | 12,15 | 1,70 | 12.77 | 9.77 |
| after 14 days at 70° C. daN | 10,85 | 0,70 | 11,55 | 9.36 |
| after 28 days at 70° C. daN | 9,70 | 1,03 | 9,90 | 8.85 |

|  | 5 | 6 | 7 | 8 | 9 |
| --- | --- | --- | --- | --- | --- |
| Bitumen 180/220 | 53,3 | 53,3 | 53,3 | 52,3 | 53,3 |
| Copolymer 1 | 9,0 | — | — | — | 11,5 |
| Copolymer 2 | — | — | — | 10,0 | — |
| Homopolymer 1 | 5,0 | 5,0 | 5,0 | 5,0 | 5,0 |
| Homopolymer 2 | — | 9,0 | 11,5 | — | — |
| Filler (calcium carbonate) | 30,0 | 30,0 | 30,0 | 30,0 | 30,0 |
| Isotactic polypropylene | 2,5 | 2,5 | — | 2,5 | — |
| Irganox 1010 | 0,2 | 0,2 | 0,2 | 0.2 | 0,2 |
| Penetration number at 25° C. dmm | 25 | 22 | 25 | 23 | 27 |
| Penetration number at 60° C. dmm | 54 | 35 | 52 | 37 | 54 |
| R&B softening point °C. | 150 | 152 | 150 | 152 | 150 |
| Viscosity at 180° C. mPa · s | 3500 | 3000 | 2000 | 3250 | 2500 |
| Cold flex °C. | −15 | −10 | −10 | −15 | −15 |
| Peeling test: | | | | | |
| after 24 h at 21° C. daN | 8,37 | 7,75 | 7,94 | 8,35 | 10,75 |
| after 7 days at 70° C. daN | 2,15 | 1,45 | 6,29 | 1,95 | 10,25 |
| after 14 days at 70° C. daN | 1,85 | 1,07 | 5,95 | 1.57 | 9.97 |
| after 28 days at 70° C. daN | 1,70 | 1,03 | 5,83 | 1,35 | 9,25 |

According to the Common directive of the UEAtc (Union Européenne pour l'Agrément technique dans la construction-European Union of Agreement) relative to the Agreement on waterproofing agents based on bitumen modified with APP (atactic polypropylene), the resistance value for the peeling test after a 28-day aging at 70° C. must be higher than 50% of the initial value and must be at least equal to 2.5 daN/5 cm. As can be seen from the above-reported data, these conditions are met by the mixtures which comply with the criteria which underlie the present invention.

The following Table 2 reports the main characteristics of the polymers used. "Copolymer 1" and "Copolymer 2" have been described above. Homopolymer 1 and Homopolymer 2 refer to amorphous polypropylene homopolymers.

TABLE 2

| Name | Viscosity at 180° C. (shear rate: 5.6/sec) | Degree of crystallinity (DSC method) |
| --- | --- | --- |
| Copolymer 1 | 300.000 mPa · s | 5,5 J/g. |
| Copolymer 2 | 80.000 mPa · s | 7,0 J/g. |
| Homopolymer 1 | 5.000 mPa · s | 9,0 J/g. |
| Homopolymer 2 | 30.000 mPa · s | 12,0 J/g. |

A further series of tests was also conducted in order to check the tightness of joints between rolls when performed with hot air-blown bitumen.

The mixtures used were nos. 2, 7, 8 and 9 listed in Table 1.

Three series of two samples each for each mixture were prepared; each sample was composed of two test pieces of membrane (25×5 cm), prepared and reinforced as already described earlier, mutually overlapping by 7 cm; the overlaps were sealed with type 85/25 hot air-blown bitumen at a temperature comprised between 220° and 230° C.

Each series of two samples was then subjected to a tensile stress test after undergoing the following treatment:

first series: 24 hours at 23°±2° C.;
second series: 7 days at 70° C. and 24 hours at 23°±2° C.;
third series: 28 days at 70° C. and 24 hours at 23°±2° C.;

The results obtained, reported in Table 3, express the force required, in daN/5 cm, to separate the two test pieces which compose the joint.

TABLE 3

|  | 2 | 7 | 8 | 9 |
| --- | --- | --- | --- | --- |
| 1) After 24 hours at 23 +/− 2° C. daN/5 cm | 44,12 | 43,13 | 45,15 | 46,65 |
| 2) After 7 days at 70° C. daN/5 cm | 17,20 | 28,35 | 18,40 | 35,44 |
| 3) After 28 days at 70° C. daN/5 cm | 15,70 | 31,75 | 16,78 | 37,68 |

The inventors believe, without however binding themselves to this type of theoretical explanation, that the behavior of the mixtures reported in the above Examples can be explained also on the basis of the consideration that the crystallinity content of the polymers used in said mixtures (measured according to the DSC method) is given predominantly by the presence of isotactic polypropylene. The greater this presence, the lower the compatibility between the bitumen and the polymer, and thus the greater the likelihood that the oils, which, in the course of time, compromise the adhesion between the polyolefin-modified membrane and the air-blown bitumen, may develop.

I claim:

1. Method of waterproofing covering structures comprising the step of applying by means of hot air-blown bitumen on a new covering structure or on a previous waterproofing layer based on air-blown bitumen, a composition comprising 50 to 80% by weight of distilled bitumen, 8 to 20% by weight of an amorphous copolymer selected from ethylene-propylene copolymer and ethylene-propylene-butene-1 copolymer and mixtures thereof, and 1 to 20% by weight of amorphous polypropylene homopolymer, said amorphous polypropylene homopolymer having a viscosity between 1000 and 50000 mPa×s and a crystallinity less than or equal to 20 J/g.

2. Method according to claim 1 wherein said composition further comprises up to 40% by weight of a filler and up to 1% by weight of an antioxidant additive.

3. Method according to claim 2 wherein said composition comprises up to 30% by weight of a filler.

4. Method according to claim 2 wherein said filler comprises at least one material selected from the group consisting of slate powder, calcium carbonate, talc, and kaolin, said material having a fineness such that at least 95% can pass through a 75-micron screen.

5. Method according to claim 1 wherein the distilled bitumen has a softening point between 36° C. and 70° C. and a penetration number between 40 and 350 dmm.

6. Method according to claim 2 wherein said antioxidant additive is selected from the group consisting of pentaerythrityl-tetrakis-3-(3,5-di-tert-butyl-4-hydroxyphenyl)-propionate and 2,2'-oxamido-bis-ethyl-3-(3,5-di-tert-butyl-4-hydroxyphenyl)-propionate.

* * * * *